US010343700B2

(12) United States Patent
Brundisch

(10) Patent No.: US 10,343,700 B2
(45) Date of Patent: Jul. 9, 2019

(54) METHOD FOR STATE DETERMINATION IN A RAIL VEHICLE

(71) Applicant: Bombardier Transportation GmbH, Berlin (DE)

(72) Inventor: Volker Brundisch, Netphen-Salchendorf (DE)

(73) Assignee: Bombardier Transportation GmbH, Berlin (DE)

(*) Notice: Subject to any disclaimer, the term of this patent is extended or adjusted under 35 U.S.C. 154(b) by 89 days.

(21) Appl. No.: 15/513,360

(22) PCT Filed: Sep. 22, 2015

(86) PCT No.: PCT/EP2015/071767
§ 371 (c)(1),
(2) Date: Mar. 22, 2017

(87) PCT Pub. No.: WO2016/046217
PCT Pub. Date: Mar. 31, 2016

(65) Prior Publication Data
US 2017/0305445 A1    Oct. 26, 2017

(30) Foreign Application Priority Data
Sep. 22, 2014   (DE) .................... 10 2014 113 669

(51) Int. Cl.
*B61K 9/08* (2006.01)
*B61L 3/00* (2006.01)
(Continued)

(52) U.S. Cl.
CPC ............ *B61L 3/002* (2013.01); *B61K 9/08* (2013.01); *G01H 1/00* (2013.01); *G01M 17/08* (2013.01); *H04W 88/02* (2013.01)

(58) Field of Classification Search
CPC . B61K 9/08; G01H 1/00; G01M 17/08; B61L 3/002; H04W 88/02
(Continued)

(56) References Cited

U.S. PATENT DOCUMENTS 5,433,111 A * 7/1995 Hershey .................. B61K 9/08
246/169 R
6,570,497 B2 * 5/2003 Puckette, IV ........... B61K 9/08
340/301
(Continued)

FOREIGN PATENT DOCUMENTS

DE  102012014331 A1   1/2014
DE  102012106807 A1   1/2014
(Continued)

Primary Examiner — Jacques M Saint Surin
(74) Attorney, Agent, or Firm — The Webb Law Firm

(57) ABSTRACT

The present invention relates to a method for determining a value of at least one state parameter of a rail vehicle and/or of a track for a railway vehicle, wherein in at least one capturing step, at least one actual first capturing signal correlated with the actual value of the state parameter is captured, via a first signal sensor on a structure in the interior of the rail vehicle, wherein, for capturing the actual first capturing signal, a first signal sensor of a mobile end device is used. For determining the value of the at least one state parameter a frequency range of the first capturing signal actual above 1 Hz to 2 Hz, preferably 4 Hz to 15 kHz, more preferably from 10 Hz to 1 kHz, is evaluated.

15 Claims, 1 Drawing Sheet

(51) Int. Cl.
*G01H 1/00* (2006.01)
*G01M 17/08* (2006.01)
*H04W 88/02* (2009.01)

(58) Field of Classification Search
USPC .......................................................... 73/579
See application file for complete search history.

(56) References Cited

U.S. PATENT DOCUMENTS

| | | | | |
|---|---|---|---|---|
| 7,705,743 | B2* | 4/2010 | Barone | B61L 15/0027 340/682 |
| 8,985,523 | B2* | 3/2015 | Chadwick | B61L 25/021 246/167 R |
| 9,310,340 | B2* | 4/2016 | Mian | G01N 29/12 |
| 9,389,205 | B2* | 7/2016 | Mian | G01N 29/12 |
| 9,395,276 | B2* | 7/2016 | Kristen | B61K 9/12 |
| 9,981,673 | B2* | 5/2018 | Martin | B61L 15/0027 |
| 2006/0219016 | A1 | 10/2006 | Wang et al. | |
| 2007/0208841 | A1 | 9/2007 | Barone et al. | |
| 2008/0272906 | A1 | 11/2008 | Breed | |
| 2009/0001226 | A1 | 1/2009 | Haygood | |
| 2010/0161255 | A1* | 6/2010 | Mian | G01N 29/041 702/56 |
| 2012/0126065 | A1* | 5/2012 | Smith | B61L 3/006 246/167 R |
| 2012/0204646 | A1* | 8/2012 | Lee | G01M 5/0066 73/594 |
| 2015/0057956 | A1 | 2/2015 | Ooe et al. | |

FOREIGN PATENT DOCUMENTS

| | | |
|---|---|---|
| DE | 102013202521 A1 | 8/2014 |
| JP | 200881102 A | 4/2008 |
| JP | 2013024827 A | 2/2013 |
| JP | 2013113775 A | 6/2013 |
| WO | 2013146502 A1 | 10/2013 |

* cited by examiner

METHOD FOR STATE DETERMINATION IN A RAIL VEHICLE

CROSS-REFERENCE TO RELATED APPLICATIONS

This application is the United States national phase of International Application No. PCT/EP2015/071767 filed Sep. 22, 2015, and claims priority to German Patent Application No. 10 2014 113 669.1 filed Sep. 22, 2014, the disclosures of which are hereby incorporated in their entirety by reference.

BACKGROUND OF THE INVENTION

The present invention relates to a method for determining a value of at least one state parameter of a rail vehicle and/or of a track for a railway vehicle, wherein, in at least one capturing step, at least one actual first capturing signal correlated with the actual value of the state parameter is captured, via a first signal sensor on a structure in the interior of the rail vehicle, wherein, for capturing the actual first capturing signal, a first signal sensor of a mobile end device. The invention further relates to a corresponding arrangement and a corresponding mobile device for determining a value of such a state parameter.

In rail vehicles, due to safety reasons, but not least because of continuous cost pressure, typically there is a requirement to detect damages or certain states of wear on vehicle components as early as possible and in good time and to take appropriate measures to prevent risks to the passengers or the environment of the vehicle. The same applies to the infrastructure used. For this reason, modern rail vehicles are often fitted with corresponding proprietary sensor units which detect signals on the vehicle, from which the actual value of certain state parameters of the vehicle can be derived, which in turn, are characteristic for a certain state of the vehicle (typically a certain state of one or more components of the vehicle).

Thus, typically, from specific vibration patterns of the vehicle structure conclusions as to the type of damage, possibly even the degree of damage of certain moving or driven components of the vehicle can be drawn. Certain vibration patterns on the vehicle can hint at, for example, a certain damage of a motor rotor, the transmission, the shafts and/or wheels etc. of the vehicle.

The problem is that the proprietary sensor units previously used in the detection are relatively expensive and complex in their implementation, so that, for economic reasons, they are not suitable for widespread use.

A generic method is known from DE 10 2012 014 331 A1 in connection with the identification of the track quality of roadways, in which only vertical accelerations acting on the vehicle are captured via the acceleration sensors of a mobile end device, such as a so-called smart phone. In this method, however, only relatively coarse conclusions about the state of the track (for example, potholes or the like in a road) may be drawn, but not about damage to components of the vehicle or finer resolution or more complex infrastructure damage.

BRIEF DESCRIPTION OF THE INVENTION

The present invention is therefore based on the object to provide a method, an arrangement and a mobile end device of the aforementioned type which do not have the above problems, or at least have them to a lesser degree, and which, in particular, in a simple manner permits a reliable and inexpensive determination of actual values corresponding to state parameters of a rail vehicle or the track, from which conclusions about the actual state of wear or state of damage of the vehicle or the track can be drawn.

The present invention is based on the technical teaching that a reliable and cost effective determination of actual values of corresponding state parameters of the rail vehicle or the track, from which conclusions about the actual state of wear or state of damage of the vehicle or track can be drawn, is possible in a simple manner if, for determining the value of at least one state parameter, higher frequency ranges of a capturing signal signal, in particular of several different capturing signals, are analyzed. It has been shown that the internal sensors of such mobile devices generate signals with sufficient frequency resolution, which allows an evaluation in higher Frequency ranges above 1 Hz to 2 Hz, preferably above 4 Hz.

The system responses of the vehicle (such as, for example, the mechanical and/or acoustic vibrations), which are relevant for analyzing the state of wear or state of damage, respectively, of the vehicle, are located especially in these higher frequency ranges. It will be appreciated here that, depending on the component of interest of the vehicle or depending on the aspect of interest of the infrastructure or depending on the vibrational excitation of interest or depending on the type of signal sensor used, respectively, different frequency ranges can be analyzed.

For example, in a vibration analysis of components the vibration excitation of which takes place by means of rotating components of the vehicle, typically the respective rotational frequency of the vibration exciting component(s) and, eventually, harmonics thereof are examined. Of course, also the respective useful frequency range of the signal sensor used plays a role in the analysis.

Thus, in the vibration analysis of suspension components of the running gear, typically, preferably frequency ranges from 1 Hz to 10 Hz, preferably 1 Hz to 4 Hz, more preferably from 1 Hz to 2 Hz, are examined. In a mechanical vibration analysis of components of the running gear or of the drive train or of structural components of the car body vibrationally excited by these, typically, preferably frequency ranges from 2 Hz to 50 Hz, preferably 4 Hz to 40 Hz, more preferably from 5 Hz to 30 Hz, are examined. In acoustic analysis, on the other hand, typically, preferably frequency ranges from 10 Hz to 20 kHz, preferably 50 Hz to 10 kHz, more preferably from 100 Hz to 1 kHz, are examined.

Furthermore, such mobile devices usually allow simultaneous capturing of several different signals (such as acceleration signals, rotation rate signals, acoustic signals, etc.), the combined evaluation of which allows a more reliable evaluation of the state of wear or state of damage of the vehicle or track, respectively.

It is understood in this case also that the signal sensor does not necessarily have to be an internal sensor of the mobile end device. Rather, it can also be an external sensor, which is (temporarily or permanently) connected to the mobile end device (wired and/or wireless) to generate the capturing signal in question, According to one aspect, the invention therefore relates to a for determining a value of at least one state parameter of a rail vehicle and/or of a track for a railway vehicle, wherein, in at least one capturing step, at least one actual first capturing signal correlated with the actual value of the state parameter is captured, via a first signal sensor on a structure in the interior of the rail vehicle, wherein, for capturing the actual first capturing signal, a first signal sensor of a mobile end device is used. For determining the value of the at least one state parameter a frequency range of the first capturing signal actual above 1 Hz to 2 Hz, preferably 4 Hz to 15 kHz, more preferably from 10 Hz to 1 kHz, is evaluated.

As mobile end device basically any mobile device can be used, which comprises at least one such suitable signal sensor. A mobile phone, in particular a smart phone, or a tablet computer or a mobile navigation device or a smart watch is preferably used as the mobile end device. Thus, particularly cost-effective solutions can be achieved.

Basically any signal sensor can be used, the signal of which at a sufficiently high frequency resolution allows drawing conclusions about the actual state of wear or state of damage of the vehicle or track, respectively. Especially simple solutions with meaningful results regarding the actual state of wear or state of damage, respectively, can be achieved when at least one acceleration sensor of the mobile end device and/or at least a rotation rate sensor of the mobile end device and/or at least one microphone of the mobile end device and/or at least one camera of the mobile end device and/or at least one temperature sensor of the mobile end device and/or at least one magnetic field sensor of the mobile end device is used as a signal sensor. As mentioned, this may be in each case either an internal sensor of the mobile end device or an external sensor (temporarily or permanently), which is connected to the mobile end device (wired and/or wireless) to generate the capturing signal in question.

As the structure inside the vehicle, at which the corresponding signal is captured or recorded, respectively, any structures within the vehicle are in principle suited, as long as the signal coupling (consequently the transfer function) between the structure and the vehicle component or the track, respectively, of interest (for the state analysis) is known to a sufficient extent. Preferably, the structure inside the vehicle is a storage device, in particular a luggage rack and/or a table and/or storage of a seat and/or an, in particular lockable, compartment of the vehicle, wherein the mobile end device, for the capturing step, is then connected to the storage device, in particular, is placed on the storage device. In addition or as an alternative, the structure in the interior of the vehicle can be a wall device, in particular a side wall, wherein the mobile end device, for the capturing step, is then connected to the wall device.

Additionally or alternatively, for the capturing step, the mobile end device can be firmly connected, in particular substantially rigidly connected, to the structure in the interior of the vehicle, whereby in particular a sufficiently well-defined signal transmission and transfer function, respectively, between the structure and the mobile end device is ensured. Additionally or alternatively, for the capturing step, the mobile end device can be connected to the structure in the interior of the vehicle by means of a clamping device, to ensure in particular a sufficiently well-defined signal transmission and transfer function, respectively, between the structure and the mobile end device.

Additionally or alternatively, for the capturing step, the mobile end device can be connected to the structure in the interior of the vehicle by means of a holder. The holder can be placed at any desired location in the vehicle. For example, it may be located in the area of a table or a seat of the vehicle. With further variance of the invention, the holder can be arranged in a compartment of the vehicle, wherein the compartment preferably is configured to be lockable. It is particularly advantageous if the holder is spatially associated to a charging device for the power supply of the end device. Of course it is particularly convenient and thus advantageous, if it is an (e.g. inductive) charging device, which eventually allows wireless charging the accumulator of the end device.

For the analysis of the actual state of wear or state of damage of the unit of interest it may be sufficient, in principle, to analyze a series of measurements of one capturing step. This may be for example, a series of measurements, which was captured during a single passing of a certain track section.

In certain preferred embodiments of the method according to the invention a plurality of measurement series can be captured and used for analysis. In these cases, the mobile end device can basically always be connected in the same measurement position and/or measurement orientation to the structure in the interior of the vehicle. In order to achieve more meaningful results or to reduce the risk of undetected malfunctions of individual sensors, however, it can also be provided that the mobile end device, for a first capturing step in a first passing through a predetermined track section of the track, is connected to the structure in the interior of the vehicle in a predeterminable first measurement position and/or measurement orientation, while the mobile end device, for a second capturing step on a second passing of the predetermined track section, is connected to the structure in the interior of the vehicle in a predeterminable second measurement position and/or measurement orientation.

In further preferred variants of the invention, in a determination step, the value of the at least one state parameter is determined using the actual first capturing signal from at least one previous capturing step. Herein, in the determination step, the value of the at least one state parameter can be determined, in particular, using the actual first capturing signals of a plurality of previous capturing steps. This makes it possible in a simple manner to consider the history of the capturing signals, and consequently also the state of wear or state of damage, respectively, of the unit of interest in the analysis.

In preferred variants of the invention, in the analysis of the state of wear or state of damage, respectively, of the unit of interest, a comparison is made between a well-known previous state and the actual state as it appears from the actual measurement, as this allows particularly reliable conclusions about wear mechanisms or damage mechanisms, respectively, underlying the state change to be drawn.

The comparison state may have been generally captured in any manner, in particular by calculation and/or via appropriate comparative measurements on the vehicle itself or on a comparison vehicle.

In certain variants of the invention, in the determination step, the value of the at least one state parameter is determined using at least one comparison capturing signal from at least one previous comparison capturing step. Herein, in the determination step, the value of the at least one state parameter can, in particular, be determined using the actual first capturing signals of a plurality of previous capturing steps, and a plurality of comparison capturing signals of a plurality of previous comparison capturing steps.

Additionally or alternatively, it can be provided that the at least one comparison capturing step was carried out on the vehicle itself or on a comparison vehicle corresponding to the vehicle at least according to the type of vehicle. In addition or as an alternative, it may be provided that the at least one comparison capturing step was carried out on the vehicle itself in a known state, in particular, in a new state or a maintenance state, in which a defined value of the at least one state parameter is given.

In other variants of the invention using comparative values obtained by calculation, in the determination step, the value of the at least one state parameter can be determined using at least one comparison model value, which itself was determined from a comparison model of the vehicle. Here, can be provided that the comparison model, in particular, provides at least an expected value of the first capturing signal at the time of capturing of the at least one actual first capturing signal.

As already mentioned, particularly suitable mobile devices allow for the simultaneous capturing of different capturing signals, whereby a more reliable analysis of the state of wear or state of damage, respectively, of the unit of interest is possible. It is therefore preferably provided that, in the at least one capturing step, at least one actual second capturing signal correlated with the actual value of the at least one state parameter is captured using a second signal sensor on the rail vehicle, and that, in the determination step, the value of the at least one state parameter is determined using the actual first capturing signal and the actual second capturing signal of at least one previous capturing step, in particular of a plurality of previous capturing steps.

It may be provided that for detection of the actual second capturing signal, a second signal sensor of the mobile end device is used. Additionally or alternatively, for determining the value of the at least one state parameter, in particular, a frequency range of the actual second capturing signal above 1 Hz to 2 Hz, preferably 4 Hz to 15 kHz, more preferably from 10 Hz to 1 kHz, can be evaluated in order to also insofar achieve a consideration of meaningful frequency ranges.

In principle, for the first and second capturing signal different frequencies or frequency ranges, respectively, can be used, in particular, depending on the frequency range in which the wear or damage has an effect on the respective capturing signal. In certain variants of the invention, however, for determining the value of the at least one state parameter, substantially the same frequency range of the actual first and second capturing signal can be evaluated.

In principle, any combinations of capturing signals may be analyzed. Particularly meaningful results are obtained, however, if as a first signal sensor at least one acceleration sensor and/or at least one rotation rate sensor of the mobile end device is used and, as a second signal sensor, at least one microphone of the mobile end device is used. Particularly this combined consideration of mechanical and acoustic vibrations enables reliable conclusions about the actual state of wear or state of damage, respectively, to be drawn.

The analyzed state parameter can in principle be any state parameter that allows appropriate conclusions about the state of wear or state of damage, respectively, of the unit of interest. Moreover, arbitrary units may be the subject of analysis. Preferably, the value of the at least one state parameter is representative of a state, in particular, a state of wear and/or a state of integrity, of at least one vehicle component of the vehicle, wherein the vehicle component, in particular, can be a component of a running gear of the vehicle and/or a component of a drive device of the vehicle and/or a component of an auxiliary operation device of the vehicle, in particular, of an air conditioner and/or a compressor of the vehicle.

In preferred variants of the invention, the first capturing signal can be stored in a manner linked with a time identification representative of the time of its detection and/or with a position identification representative of the actual position of the vehicle and/or of the end device and/or with at least one operational information representative of at least one actual operating state of the vehicle, in particular an actual speed of the vehicle, and/or with an identifier of the vehicle, in particular a singular and unique identifier of the vehicle, and/or with a measurement position information representative of the position of the end device within the vehicle during the capturing step. By this means it is possible in an advantageous manner to include the corresponding time information or position information or operational state information or vehicle identification or measurement position information, respectively, in the analysis. This is particularly useful in cases where a plurality of temporally subsequent series of measurements is analyzed. In particular, the vehicle identification permits a rapid mapping of the capturing signal to the respective vehicle, while the measurement position information allows drawing conclusions about the signal transmission or transfer function, respectively, between the structure and the mobile end device and, thus, overall allows a more precise analysis.

In certain variants of the invention, in the determination step, the value of the at least one state parameter can be determined using the position identification and a track information representative of the state of the track used. This has the advantage that, with the track information, the fraction or contribution, respectively of the track to the captured signal response of the vehicle can be estimated or considered, respectively.

Additionally or alternatively, the at least one state parameter can be a state parameter of the vehicle, wherein, in the determination step, the value of the at least one state parameter is determined using the position identification and the first capturing signals of a plurality of passings of the vehicle over a predeterminable track section of the track. By this means, using the change in the captured signal response of the vehicle between the passings of the vehicle, conclusions on the actual state of wear or state of damage, respectively, can be drawn with higher reliability.

In further variants of the invention the at least one state parameter can be a state parameter of the track, wherein, in the determination step, the value of the at least one state parameter is determined using the position identification and first capturing signals of a plurality of passings of the vehicle over a predeterminable track section of the track and/or passings of a plurality of different vehicles over a predeterminable track section of the track. By this means, using the change in the captured signal response of the vehicle between the passings of the vehicle, conclusions on the actual state of wear or state of damage, respectively, of the track can be drawn with higher reliability. The same applies to similar signal responses of different vehicles at the same position.

The first capturing signal can basically be stored in any suitable manner and forwarded for further processing. Preferably, the first capturing signal is stored and/or forwarded in a manner secured against manipulation, in particular, in a manner secured against undetected manipulation. To this end, any suitable cryptographic methods or mechanisms can be applied. In particular, the first capturing signal may be encrypted and/or be provided with a digital signature. The same naturally applies for already appropriately prepared data that are generated from the first capturing signal. Such logical securing of the captured and/or processed data is advantageous in particular with regard to a reliable and tamper-proof analysis of the vehicle and/or the track.

Furthermore, such logical securing of the data used or transmitted for analysis, respectively, enables the secure implementation of incentive systems that allow a variety of users of the vehicle to be motivated to make their mobile devices available for the state analysis, as will be explained in greater detail below.

In a detection step, the identification of the vehicle and/or the measurement position information is preferably entered into the end device via a corresponding input device. This can be a simple input via a keyboard of the end device. With particularly advantageous variance the input takes place via a wireless communication device and/or a bar code scanner of the end device.

The input can be effected by the user of the end device who, via a corresponding actuation of the end device triggers reading of the identification of the vehicle and/or the measurement position information. Thus, for example, the user of the end device can read a machine-readable code (for example a barcode or the like) via a corresponding reading device (for example a barcode scanner) of the end device. Of course it is also possible that the corresponding information is read wired or wireless, for example, via so-called near field communication (NFC), from a memory mounted to the vehicle. Such electronic reading, in particular, can happen automatically upon entering the vehicle and/or upon connecting the end device with a holder of the vehicle.

The analysis of the collected data can generally be done at any location. Thus, the determination step may be carried out in a data processing unit of the mobile end device and/or of the vehicle and/or of a remote data center. Additionally or alternatively, the capturing signals of the mobile end device captured in the at least one capturing step and/or evaluation data derived therefrom, for carrying out the determination step, can be transmitted as transmission data in a transmission step via a communication device of the mobile end device, in particular through a wireless communication network, to a data processing unit of the vehicle and/or to a remote data center.

Here, the above-mentioned incentive system for end device users can be implemented in particular. Thus, it may be provided that, as a function of a successful verification of the transmission data (in particular depending on their authenticity and/or usability for the analysis), in a remuneration step subsequent to the transmission step, a remuneration for the transmission of the transmission data is executed. For example, the user of the transmitting ends device, as a remuneration for the transmission of the transmission data, can obtain a deposit on his account (for example his bank account or a bonus points account with the operator of the vehicle or with a third party). This deposit can then be used by the user, for example, to purchase tickets with the operator of the vehicle etc.

In this context, it is of course advantageous if the transmission of data (in the manner described above) is appropriately logically secured and also includes an appropriate (preferably unique and unambiguous) identification of the end device and/or the user of the end device.

A combination of the acquired data entered for evaluation with a sufficiently precise identification of the end device can of course be of advantage in any of the above variants. In this way, conclusions about the properties of the respective signal sensor of the end device can be drawn therefrom, which can then be considered in the evaluation. Here, it must not necessarily be a unique and unambiguous identification of the end device, rather already a model number of the end device or the like may be sufficient to draw sufficient conclusions about the signal sensor in question.

In preferred variants of the invention, in dependence on the value of the at least one state parameter, which was determined in the determination step, a reaction can be carried out in a reaction step. This can be any reaction, such as a notice to the vehicle operator or, depending on the significance of the detected condition for the safety of passengers or the vehicle environment, also an immediate, optionally automatic intervention into the operation of the vehicle (for example, a slowing down or complete braking of the vehicle to a stop, etc.).

The present invention further relates to an arrangement for determining a value of at least one state parameter of a rail vehicle and/or of a track for a railway vehicle, which is in particular suited for performing the method according to the invention. The arrangement comprises a rail vehicle, a detection device, and at least one data processing device, wherein the capturing device is configured to capture, in at least one capturing step via a first signal sensor on the rail vehicle, at least one actual capturing signal correlated with the actual value of the state parameter. The data processing device is configured to determine the value of the at least one state parameter using the actual capturing signal of the first capturing device from at least one previous acquisition step in a capturing step. The capturing device is a first signal sensor of a mobile end device, which is arranged on a structure in the interior of the vehicle at at least one measurement position and/or in at least one measurement orientation. The data processing device is configured to evaluate, for determining the value of the at least one state parameter, a frequency range of the actual first capturing signal above 1 Hz to 2 Hz, preferably 4 Hz to 15 kHz, more preferably from 10 Hz to 1 kHz.

The present invention further relates to a mobile end device, in particular a mobile telephone, for determining a value of at least one state parameter of a rail vehicle and/or of a track for a railway vehicle, which is in particular suitable for performing the method according to the invention. The mobile end device comprises at least one first signal sensor and a data processing device, wherein the at least one first signal sensor is configured for capturing at least one actual first capturing signal correlated to the actual value of the state parameter. For determining the value of the at least one state parameter, the data processing device is configured to evaluate a frequency range of the actual first capturing signal above 1 Hz to 2 Hz, preferably 4 Hz to 15 kHz, more preferably from 10 Hz to 1 kHz. In addition or as an alternative, for determining the value of the at least one state parameter, the data processing device can be configured to output the actual first capturing signal to a further data processing device in a manner which allows the evaluation of a frequency range of the actual first capturing signal above 1 Hz to 2 Hz, preferably 4 Hz to 15 kHz, more preferably from 10 Hz to 1 kHz, in the further data processing device.

With the arrangement according to the invention or the mobile device according to the invention, respectively, the variants and advantages described above in connection with the method according to the invention can be realized to the same extent, such that reference is made to the above statements.

Further preferred embodiments of the invention become apparent from the dependent claims and the following description of preferred embodiments, which refers to the accompanying drawings.

DETAILED DESCRIPTION OF THE INVENTION

Figure 1:
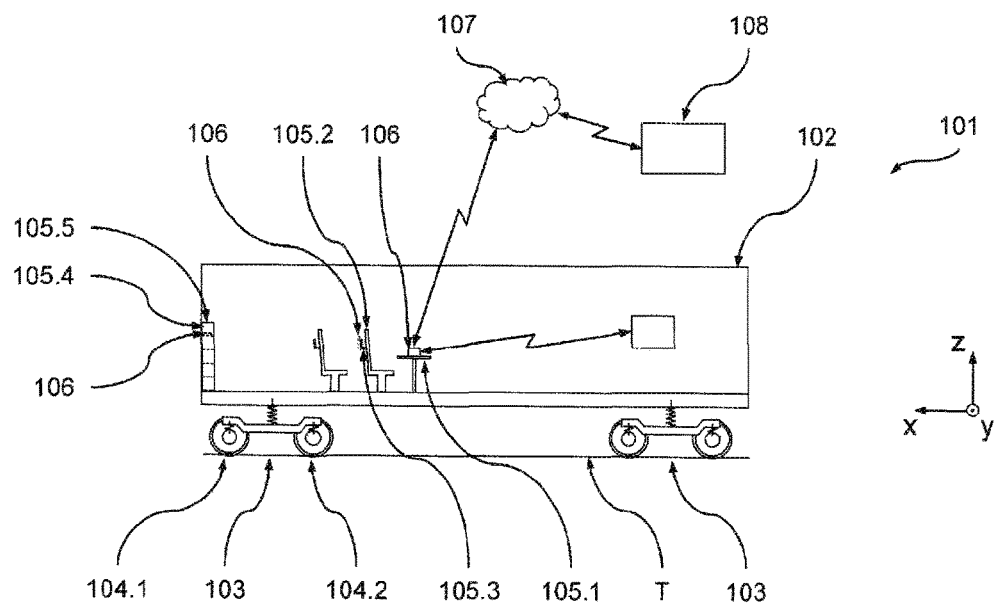
FIG. 1 is a schematic side view of a preferred embodiment of the arrangement according to the invention with a rail vehicle as well as with a preferred embodiment of the mobile end device according to the invention which are suitable for carrying out a preferred embodiment of the method according to the invention.
Figure 2:
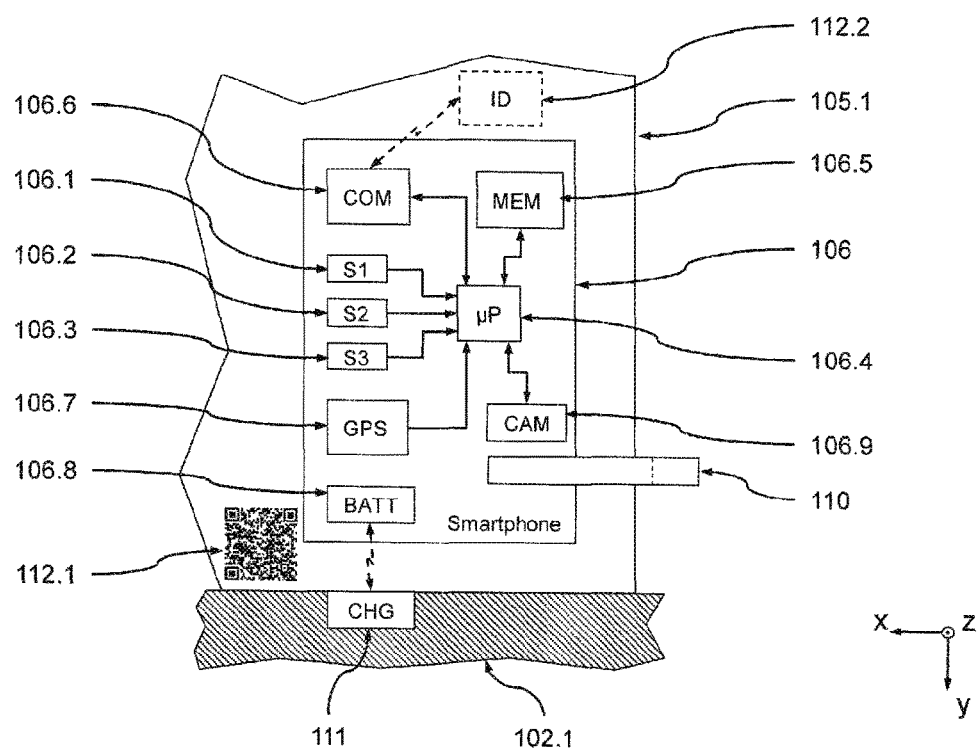
FIG. 2 is a schematic view of the mobile end device of FIG. 1

In the following, with reference to the FIGS. 1 and 2, a preferred embodiment of the method according to the invention will be described by way of a rail vehicle 101. The rail vehicle 101 is a wagon of a train set with a nominal operating speed above 180 km/h, namely $v_n$=200 km/h.

The vehicle 101 comprises a wagon body 102 which is supported in the region of its two ends in a conventional manner in each case on a running gear unit in the form of a bogie 103 having two wheel units in the form of a first wheel set 104.1 and a second wheel set 104.2. It will be appreciated, however, that the present invention can also be used in conjunction with other configurations, in which the wagon body is only directly supported on one running gear. Likewise, instead of wheelsets, other wheel units, such as wheel pairs or individual wheels may be provided.

For ease of understanding of the following explanations a vehicle coordinate system x,y,z (defined by the wheel contact plane of the bogie 103) is shown in the figures, in which the x coordinate designates the vehicle longitudinal direction, the y coordinate designates the vehicle transverse direction and the z coordinate designates the vehicle height direction of rail vehicle 101, respectively.

The vehicle 101 is a vehicle for transporting passengers, wherein, inside the wagon body 102, seating (not shown in greater detail) and, in some locations, tables 105.1 for the passengers are provided, which are (substantially rigidly) connected to both the wall structure 102.1 and the floor structure 102.2 of the wagon body 102.

In the present example, for determining the actual state of wear or state of damage of certain components of the vehicle 101 as well as of the traveled track T, a mobile end device in the form of a smartphone 106 as used, which is placed on the table 105.1 and, optionally, is connected to the table via a holder or clamping device, respectively, in the form of a clamp 110.

The mobile end device 106 includes a number of signal sensors, wherein in particular there is provided a first signal sensor in the form of an acceleration sensor 106.1, a second signal sensor in the form of a microphone 106.2, and a third signal sensor in the form of a rotation rate sensor 106.3. Here, in operation, the acceleration sensor 106.1 captures, as a first capturing signal S1, the accelerations acting on the mobile end device 106 in all three spatial axes or spatial directions (x,y,z), while the microphone 106.2, as a second capturing signal S2, captures a recording of the ambient noise, and the rotation rate sensor 106.3 captures, as a third capturing signal S3, the rate of rotation about all three spatial axes (x,y,z).

The mobile end device 106 further includes a first data processing unit in the form of a processor 106.4 which accesses a memory 106.5. In the memory 106.5 both programs and data are stored, which the processor 106.4 uses during operation of the mobile end device 106.

The mobile end device 106 finally comprises a communication module 106.6 and a position determining device in the form of a GPS module 106.7. Via the communication module 106.6, in a conventional manner, for example, over a wireless communication network 107, a data exchange with a remote second data processing unit the form of a remote data center 108 can take place. Likewise, it is also possible to establish a connection to a further data processing unit 109 of the vehicle 101 via a local wireless data connection (e.g. via a WLAN or Bluetooth connection, etc.).

Via the GPS module 106.7, also in a conventional manner, the actual position information of the mobile end device 106 is determined and transmitted to the processor 106.4. The GPS module 106.7 may also be used in a conventional manner to synchronize a time capturing module, such as an internal real time clock, of the processor 106.4 with an external time source. Likewise, the synchronization can also take place via the mobile network 107.

A measurement program is stored, among other things, in the memory 106.5, upon operation of which the processor 106.4 triggers signal sensors 106.1 to 106.3 in order to capture, in a first capturing step, via the signal sensors 106.1 to 106.3, the actual values of the signals S1 to S3 and to store the latter as a first series of measurements MR1 in the memory 106.5. The values of the signals S1 to S3 are stored in a manner linked with a position information PI, which is derived from the position signal from GPS module 106.7, as well as linked with a time information TI, which is generated in the processor 106.4.

In preferred variants of the invention, the capturing signals S1 to S3 can also be stored in a manner linked with at least one operational information BI representative of the actual operating state of the vehicle, in particular of an actual speed of the vehicle. Further, the capturing signals S1 to S3 are stored in a manner linked with a unique and unambiguous identifier VID of the vehicle 101 and with measurement position information MPI representative of the position of the end device 106 within the vehicle 101 during the capturing step. By this means, it is possible in an advantageous manner to incorporate also this operational information BI, vehicle identification VID and the measurement position information MPI together with the corresponding time information TI and the position information PI, respectively, into the analysis. This is particularly useful in cases where a plurality of temporally subsequent series of measurements MR1 to MRn is analyzed.

The vehicle identification VID permits rapid mapping of the capturing signals S1 to S3 to the respective vehicle 101, while the measurement position information MPI allows drawing conclusions about the signal transmission or transfer function between the structure of the vehicle 101 and the mobile end device 106 and, thus, allows an overall more precise analysis of the capturing signals S1 to S3.

In a detection step, the vehicle identification or identification VID of the vehicle 101 and the measurement position information MPI is entered or read into the end device 106, respectively. In the present example, reading takes place via a camera 106.9, via which the user of the end device 106 captures a barcode 112.1, which is attached to the table 105.1. The processor 106.4 of the end device 106 then uses a barcode scanner program stored in memory 106.5 to extract the identifier VID of the vehicle 101 and the measurement position information MPI from the recorded barcode 112. The measurement position information MPI, in particular, designates the exact position of the table 105.1 inside the vehicle 101.

Alternatively, the vehicle identification VID and the measurement position information MPI can eventually also be carried out automatically when attaching the end device 106 at the table 105.1. For example, the corresponding information VID, MPI can be read wirelessly via a so-called near-field communication (NFC) by the communication module 106.6 from a memory 112.2 attached, for example, to the table 105.1. This can happen in a manner triggered by the user of the end device 106 or automatically, for example, upon sufficient proximity to the memory 112.2 or by a corresponding switch (not shown) located at the table 105.1.

In the present example, the signals S1 to S3 of the first measurement series MR1 augmented with the position identifier PI, the time identifier TI, the vehicle identification VID and the measured position information MPI are then transmitted as transmission data TMD over the wireless network 107 to the remote data center 108.

Here, the signals S1 to S3 of the first measurement series MR1 augmented to the transmission TMD are stored and forwarded by processor 106.4 in a manner secured against undetected manipulation (using corresponding cryptographic programs stored in memory 106.5). For this purpose, any suitable cryptographic methods or mechanisms can be applied. In the present example, the augmented signals S1 to S3 of the first measurement series MR1 are linked with a unique unambiguous identification SID of the end device 106 and are provided with a digital signature SIG of the end device 106. Such a logical securing of the captured and/or processed data is advantageous in particular with regard to a reliable and tamper-proof analysis of the vehicle 101 and the track used by the vehicle 101.

Via the identification SID of the end device 106 it is also possible to draw conclusions, in the subsequent analysis of the transmission data TMD, about the position and/or properties of the signal sensors 106.1 to 106.3 built-in to the end device, and to include this information, where appropriate, in the analysis. It will be appreciated that, in other variants, less precise information on the end device 106 can be sufficient. For example, for this purpose, a type number of the end device may be sufficient.

An analysis of the processed signals S1 to S3 of the first series of measurements MR1 if then carried out in the data center 108 in order to draw conclusions on the actual state of wear or state of damage, respectively, of certain components of the vehicle 101 or the track T. Here, the fact is utilized that the sensors 106.1 to 106.3 of such mobile end devices 106 typically generate signals S1 to S3 with sufficient frequency resolution which allow an evaluation of the signals S1 to S3 in higher frequency ranges above 1 Hz to 2 Hz, preferably above 4 Hz.

Especially these higher frequency ranges comprise the system responses of the vehicle 101 (such as the mechanical and/or acoustic vibrations) which are relevant for analyzing the state of wear or state of damage, respectively, of certain components of the vehicle 101 and the track T. Herein, simultaneous detection of several different signals S1 to S3 allows their combined evaluation and, thus, a more reliable assessment of the state of wear or state of damage, respectively, of the relevant components of the vehicle 101 and the track T, respectively.

Certain states of wear or damages to the individual vehicle component or the track T are typically associated with characteristic vibration patterns, which are taken into account in the analysis. Especially the analysis of multiple, simultaneously captured signals S1 to S3 permits better identification of the actual state or a state parameter of the relevant component of the vehicle 101 or the track T representative thereof, since certain vibrational pattern of a signal (e.g. of the signal S1) may be associated with multiple different states of one or more components of the vehicle 101 and the T, respectively, the simultaneously captured vibration patterns of at least one other signal (e.g. the signal S2 and/or S3) allow assignment to a specific condition of a component of the vehicle 101 and the track T, respectively.

Therefore, in the present example, in the data center 108, an evaluation of the signals S1 to S3 and a respective determination of the value of the at least one state parameter of the vehicle 101 and the track, respectively, takes place in a frequency range above 1 Hz to 2 Hz, preferably 4 Hz to 15 kHz, more preferably from 10 Hz to 1 kHz.

In the present example, in the vibration analysis of the suspension components of the running gear 103, the signals S1 and S3 are preferably analyzed in the frequency range of 1 Hz to 10 Hz, preferably 1 Hz to 4 Hz, more preferably from 1 Hz to 2 Hz. Furthermore, the signals S1 and S3 are respectively analyzed in a frequency range of 2 Hz to 50 Hz, preferably 4 Hz to 40 Hz, more preferably from 5 Hz to 30 Hz, for mechanical vibration analysis of the vehicle structures. In contrast, for an acoustic analysis, the signal S2 is analyzed in a frequency range of 10 Hz to 20 kHz, preferably from 50 Hz to 0 kHz, more preferably from 100 Hz to 1 kHz.

In the present example, the mobile end device 106 is located at the table 105.1 as a structure in the interior of the vehicle 101 at which the signal corresponding to S1 to S3 can be captured or recorded, respectively. For this purpose, in principle, any structures within the vehicle 101 are suited, as long as the signal coupling (consequently therefore the transfer function) between the structure (such as the table 105.1) and the vehicle component (of interest for the state analysis) or the track T is known to a sufficient extent.

It will be appreciated, however, that as a structure in the interior of the vehicle 101, a different storage device, in particular a luggage rack, can be used. Additionally or alternatively, the structure inside the vehicle, can be a wall device, in particular, the side wall of 102.1, or the floor 102.2, wherein the mobile end device 106, for the capturing step, is then connected to the wall device 102.1 or the floor 102.2. It is also possible to use a storage device of a seat 105.2 or a holder 105.3 for the mobile end device 106 located at the seat 102.2. Finally, the storage device may be a, preferably lockable, compartment 105.4 in a cabinet 105.5 connected to the vehicle structure in the vehicle 101, which then preferably has a corresponding holder for the mobile end device 106.

It is understood that the above-described method for reading in the vehicle identification VID and the measured position information MPI then of course can be applied not only in the context of table 105.1, but also in the other described variants for mounting the end device, hence, for example, in the context of the holder 105.3 of seat 105.2 or in the context of the compartment 105.4 as well as in the context of any other location in the vehicle 101.

In the present example, for the capturing step, the mobile end device 106 may eventually simply be placed onto table 105.1. Preferably, as described, for the capturing step, the mobile end device will be firmly, in particular, substantially rigidly, connected with table 105.1 (or the relevant structure inside the vehicle 101) via a holder or clamping device 110, respectively, whereby in particular a well-defined signal transmission or transfer function, respectively, between the relevant structure (e.g. the table 105.1) and the mobile end device 106 is guaranteed.

It is particularly favorable if the holder or clamping device 110, respectively, is spatially associated to a charging device 111 for power supply to the end device. Of course it is particularly convenient and therefore advantageous if it is the case of an (e.g. inductive) charging device 11, which eventually allows a wireless charging the accumulator 106.8 of the end device 106.

For the analysis of the actual state of wear or state of damage, respectively, of the component of interest of the vehicle 101 and the track T it may principle be sufficient to analyze one series of measurements MR1 from one capturing step. This may be, for example, a series of measurements, which was recorded during a single passing of a certain track section.

Preferably, multiple series of measurements MR1 to MRn can be captured and used for the analysis. In these cases, the mobile end device 106 can in principle always be connected in the same measurement position and/or measurement orientation with the structure in the interior of vehicle 101 (for example, table 105.1). In order to achieve more meaningful results or to reduce the risk of undetected malfunctions of individual sensors 106.1 to 106.3, however, it can also be provided that the mobile end device 106, for a first capturing step or a first series of measurements MR1, respectively, during a first passing of a predetermined track section of the track T, is connected to the structure in the interior of the vehicle 101 (e.g. table 105.1) in a predeterminable first measurement position and/or measurement orientation, while the mobile end device 106, for a second capturing step or a second series of measurements MR2, respectively, during a second passing through the predetermined track section, is connected to the structure in the interior of the vehicle 101 (e.g. table 105.1) in a predeterminable second measurement position and/or measurement orientation.

Preferably, therefore, in a determination step of analysis in the data center, the value of the state parameter is obtained using the capturing signals S1 to S3 of one or more previous capturing steps or one or more previous measurement series MR2 to MRn, respectively. This makes it possible in a simple manner, to take into account in the analysis the history of the capturing signals S1 to S3, consequently therefore also of state of wear or state of damage, respectively, of the component of interest of the vehicle 101 and the track T.

In the analysis of the state of wear or state of damage, respectively, of the component of interest of the vehicle 101 or the track T, respectively, preferably, a comparison is made between a well-known previous state and the actual state as it emerges from the actual measurements or measurement series MR1, as this allows particularly reliable conclusions to be drawn on wear mechanisms or damage mechanisms underlying the state change.

Generally, the comparison state may have been acquired in any manner, in particular by calculation and/or via appropriate comparative measurements on the vehicle 101 itself or a comparison vehicle. In certain variants, in the determination step, the value of at least one state parameter is determined using comparison capturing signals VS1 to VS3 of at least one previous comparison capturing step and at least one previous measurement series MR2 to MRn. Herein, in the determination step, the value of the at least one state parameter can be determined using the first actual capturing signals from a plurality of previous capturing steps or measurement series MR2 to MRn, respectively, and a plurality of comparison capturing signals of a plurality of previous comparison capturing steps VS1 to VS3.

It can be provided that the at least one comparison capturing step (with the comparison capturing signals VS1 to VS3) has taken place via the mobile end device 106 and was carried out on the vehicle 101 itself in a known state, especially in a new state or a maintenance state, in which a defined value of the at least one state parameter is given.

In other variants with comparison values obtained by calculation, in the determination step, the value of the at least one state parameter can be determined using at least one comparison model value VM1 to VM3, which in turn was determined via a comparison model of the vehicle 101. It can be provided that the comparison model, with the comparison model values VM1 to VM3, delivers the value of the respective capturing signal S1 to S3 expected at the time of detection of the actual capturing signal S1 to S3.

Basically, for the different capturing signals S1 to S3, different frequencies or frequency ranges, respectively, may be used, in particular, depending on the frequency range in which the wear or damage, respectively, has an effect on the respective capturing signal S1 to S3. In order to determine the value of the at least one state parameter, however, substantially the same frequency range of the respective actual capturing signal S1 to S3 may also be evaluated.

In the present example, arbitrary components of the vehicle 101 can be the subject of the analysis. Here, the vehicle component can be a component of a bogie 103 and/or a component of a drive device of the vehicle 101 and/or a component of an auxiliary operation device of the vehicle 101, in particular of an air conditioner and/or of a compressor of the vehicle 101.

In certain variants of the invention, in the determination step, the analysis may take place using the position information and a track information representative of the state of the track (at the location corresponding to the position information PI). This has the advantage that, using the track information, the fraction or contribution, respectively, of the track T to detected signal response of the vehicle 101 can be estimated and considered, respectively.

Furthermore, in the determination step, the value of the respective state parameter of a component of the vehicle 101 can be determined using the position identifier or position information PI, respectively, and capturing signals S1 to S3 from a plurality of passings of the vehicle 101 (or corresponding measurement series MR1 to MRn) over a predetermined track section of the track T. Here with, using the change in the detected signal response of the vehicle 101 between the passings of the vehicle 101, conclusions on the actual state of wear or state of damage, respectively, of the component of the vehicle 101 can be drawn with higher reliability.

In further variants of the invention, in the determination step, the value of a state parameter of the track T can be determined using the position identification or position information PI, respectively, and capturing signals S1 to S3 T captured in a plurality of passings of the vehicle 101 over a predetermined track section of the track and/or passings of a plurality of different vehicles 101 over the predetermined track section of the track T. By this means, using the change in the detected signal response of the respective vehicle 101 between the passings of the respective vehicle 101, conclusions may be drawn with higher reliability on the actual state of wear or state of damage, respectively, of the track T. The same applies to similar signal responses of different vehicles 101 at the same position.

In the present example, the analysis of the acquired data or measurement series MR1 to MRn, respectively, is carried out in the remote data center 108. However, it can also be provided that the analysis (i.e. the determination step) is carried out, additionally or alternatively, in the processor 106.4 of the mobile end device 106 and/or in the data processing unit 109 of the vehicle 101.

In the present example, in a reaction step, a reaction can be carried out as a function of the result of the analysis, hence as a function of the value of the at least one state parameter which has been determined in the determination step. This can be an arbitrary reaction, such as a notice to the driver of the vehicle 101 or, depending on the significance of the detected state for the safety of passengers or the vehicle environment, also an immediate, optionally automatic, intervention in the operation of the vehicle 101 (for example, a slowing down or a complete braking of the vehicle to a stop, etc.).

In the present example, an incentive system for the users of the end device users may be implemented in an advantageous manner. Thus, it can be provided that, depending on the successful verification of the transmission data TMD (in particular depending on their authenticity and/or utility for the analysis), in a remuneration stop subsequent to the transmission step, a remuneration is carried out for the transmission of the transmission data TMD. For example, the user of the transmitting end device 106, as a remuneration for the transmission of the transmission data TMD, may receive a deposit on his account (for example, his bank account or a bonus points account with the operator of the vehicle or with a third party). This deposit may be used by the user to purchase, for example, tickets with the operator of the vehicle 101, etc.

In this context, it is of course advantageous if the transmission data TMD are appropriately logically secured in the manner already described above via a digital signature SIG and, in addition, may be allocated to the end device 106 and, hence, to the user of the end device 106 in an unambiguous and manipulation safe manner via the unique and unambiguous identification SID of the end device 106.

The present invention has been described solely by way of examples in which the capturing signals S1 and S3 in all three spatial directions (x, y, z) were evaluated. It will be appreciated, however, that the invention can also be used in the context of capturing signals, in which less or only individual ones of the three spatial directions (x, y, z) are evaluated, when this alone already allows meaningful conclusions to be drawn.

The present invention has been described solely by way of examples in which three capturing signals S1 to S3 were evaluated. It will be appreciated, however, that the invention can also be used in connection with any other number of capturing signals. In particular, it can be enough to evaluate a single capturing signal (e.g. only one of the signals S1 to S3) if from this alone is meaningful conclusions can be drawn.

The invention claimed is:

1. A method for determining a value of at least one state parameter of at least one of a rail vehicle and a track for the rail vehicle, the method comprising:
   capturing, in at least one capturing step, at least one actual first capturing signal correlated with the actual value of the state parameter, via a first signal sensor of a mobile end device on a structure in an interior of the rail vehicle, wherein the first signal sensor of the mobile end device is internal to the mobile end device; and
   evaluating, with at least one processor, the at least one actual first capturing signal in a frequency range of least one of: 1 Hz to 2 Hz, 4 Hz to 15 kHz, and 10 Hz to 1 kHz to determine the value of the at least one state parameter.

2. The method according to claim 1, wherein the mobile end device comprises one of the following: a mobile telephone, a tablet computer, a mobile navigation device, and a smartwatch.

3. The method according to claim 1, wherein the first signal sensor comprises at least one of the following: at least one acceleration sensor of the mobile end device, at least one rotation rate sensor of the mobile end device, at least one microphone of the mobile end device, at least one camera of the mobile end device, at least one temperature sensor of the mobile end device, at least one magnetic field sensor of the mobile end device, or any combination thereof.

4. The method according to claim 1, wherein at least one of the following:
   (i) the structure in the interior of the rail vehicle includes a storage device including at least one of the following: a luggage rack, a table, storage of a seat, a lockable compartment of the vehicle, or any combination thereof, and the mobile end device, during the at least one capturing step, is connected to the storage device,
   (ii) the structure in the interior of the rail vehicle includes a wall, and the mobile end device, during the at least one capturing step, is connected to the wall,
   (iii) the mobile end device, for the at least one capturing step is substantially rigidly connected to the structure in the interior of the rail vehicle,
   (iv) the mobile end device, for the at least one capturing step, is connected to the structure in the interior of the rail vehicle by a clamping device,
   (v) the mobile end device, for the at least one capturing step, is connected to the structure in the interior of the rail vehicle by a holder, wherein the holder is arranged in a compartment of the rail vehicle, wherein the compartment is lockable, and wherein the holder is spatially associated to a charging device for the mobile end device,
   (vi) the mobile end device, for a first capturing step of the at least one capturing step in a first passing through of a predetermined track section of the track, is connected to the structure in the interior of the rail vehicle in at least one of a predeterminable first measurement position and a predeterminable first measurement orientation, and the mobile end device, for a second capturing step on a second passing of the predetermined track section, is connected to the structure in the interior of the rail vehicle in at least one of a predeterminable second measurement position and a predeterminable second measurement orientation different than the at least one of the predeterminable first measurement position and the predeterminable first measurement orientation,
   or any combination thereof.

5. The method according to claim 1, further comprising:
   determining, with at least one processor in a determination step, the value of the at least one state parameter using the at least one actual first capturing signal from at least one previous capturing step, and
   determining, with at least one processor in the determination step, the value of the at least one state parameter using actual first capturing signals of a plurality of previous capturing steps.

6. The method according to claim 5, wherein, in the determination step, the value of the at least one state parameter is determined using at least one comparison capturing signal from at least one previous comparison capturing step, and
   wherein at least one of the following:

(i) in the determination step, the value of the at least one state parameter is determined using the actual first capturing signals of the plurality of previous capturing steps, and a plurality of comparison capturing signals of a plurality of previous comparison capturing steps, (ii) the at least one comparison capturing step is performed on the rail vehicle or on a comparison vehicle corresponding to the rail vehicle at least according to the type of vehicle, (iii) the at least one comparison capturing step is performed on the rail vehicle in a known state in which a defined value of the at least one state parameter is given, or any combination thereof.

7. The method according to claim 5, wherein, in the determination step, the value of the at least one state parameter is determined using at least one comparison model value, wherein the at least one comparison model value is determined from a comparison model of the rail vehicle, and wherein the comparison model provides at least an expected value of the at least one actual first capturing signal at the time of capturing of the at least one actual first capturing signal.

8. The method according to claim 1, wherein, in the at least one capturing step, at least one actual second capturing signal correlated with the actual value of the at least one state parameter is captured using a second signal sensor on the rail vehicle, wherein, in the determination step, the value of the at least one state parameter is determined using the at least one actual first capturing signal and the at least one actual second capturing signal of at least one previous capturing step of a plurality of previous capturing steps, and wherein at least one of the following:
(i) for capturing the at least one actual second capturing signal a second signal sensor of the mobile end device is used,
(ii) for determining the value of the at least one state parameter the at least one actual second capturing signal is evaluated in a frequency range of at least one of: 1 Hz to 2 Hz, 4 Hz to 15 kHz, and 10 Hz to 1 kHz,
(iii) for determining the value of the at least one state parameter substantially the same frequency range of the at least one actual first capturing signal and the at least one actual second capturing signal is evaluated,
(iv) the first signal sensor includes at least one of at least one acceleration sensor and at least one rotation rate sensor of the mobile end device, and the second signal sensor includes at least one microphone of the mobile end device, or any combination thereof.

9. The method according to claim 1, wherein the value of the at least one state parameter is representative of a state of at least one of wear and integrity of at least one vehicle component of the rail vehicle, wherein at least one of the following:
(i) the vehicle component is a component of a running gear of the rail vehicle,
(ii) the vehicle component is a component of a drive device of the rail vehicle
(iii) the vehicle component is a component of an auxiliary operation device of the rail vehicle including at least one of an air conditioner and a compressor of the rail vehicle, or any combination thereof.

10. The method according to claim 1, wherein the at least one actual first capturing signal is stored in a manner linked with at least one of a time identification representative of a time of detection of the at least one actual first capturing signal, a position identification representative of an actual position of at least one of the rail vehicle and the mobile end device, at least one operational information representative of at least one actual operating state of the rail vehicle including an actual speed of the rail vehicle, an identifier of the rail vehicle including a unique and unambiguous identifier of the rail vehicle, a measurement position information representative of the position of the mobile end device within the rail vehicle during the capturing step, or any combination thereof, and wherein at least one of the following:
(i) in the determination step, the value of the at least one state parameter is determined using the position identification and a track information representative of the state of the track used,
(ii) the at least one state parameter is a state parameter of the rail vehicle and, in the determination step, the value of the at least one state parameter is determined using the position identification and first capturing signals of a plurality of passings of the rail vehicle over a predeterminable track section of the track,
(iii) the at least one state parameter is a state parameter of the track, and, in the determination step, the value of the at least one state parameter is determined using the position identification and first capturing signals of at least one of a plurality of passings of the rail vehicle over a predeterminable track section of the track and passings of a plurality of different vehicles over a predeterminable track section of the track,
(iv) the at least one actual first capturing signal is at least one of encrypted and provided with a digital signature,
(v) in a detection step, at least one of the identification of the rail vehicle and the measurement position information is entered into the mobile end device via at least one of a wireless communication device and a bar code scanner automatically upon at least one of entering the rail vehicle and connecting the mobile end device with a holder of the rail vehicle, or any combination thereof.

11. The method according to claim 1, wherein at least one of:
(i) the determination step is carried out in a data processing unit of at least one of the mobile end device, the rail vehicle, and a remote data center,
(ii) at least one of the capturing signals of the mobile end device captured in the at least one capturing step and evaluation data derived therefrom, for carrying out the determination step, are transmitted as transmission data in a transmission step via a communication device of the mobile end device, through a wireless communication network, to at least one of a data processing unit of the rail vehicle and a remote data center, wherein in a remuneration step subsequent to the transmission step, a remuneration for the transmission of the transmission data is executed,
(iii) in a reaction step, a reaction is carried out dependent on the value of the at least one state parameter which has been determined in the determination step, or any combination thereof.

12. A system for determining a value of at least one state parameter of at least one of a rail vehicle and a track for the rail vehicle, comprising:
the rail vehicle;
a capturing device; and
at least one data processing device, wherein the capturing device is configured to capture, in at least one capturing step via a first signal sensor of a mobile end device on the rail vehicle, at least one actual capturing signal correlated with the actual value of the state parameter, wherein the data processing device is configured to determine the value of the at least one state parameter using the at least one actual capturing signal of the first capturing device from at least one previous capturing step, wherein the capturing device includes the first signal sensor of the mobile end device, wherein the mobile end device is arranged on a structure in an interior of the rail vehicle at least one of at least one measurement position and at least one measurement orientation, and wherein the first signal sensor of the mobile end device is internal to the mobile end device, and wherein the data processing device is configured to evaluate, for determining the value of the at least one state parameter, the at least one actual capturing signal in a frequency range of at least one of 1 Hz to 2 Hz, 4 Hz to 15 kHz, and 10 Hz to 1 kHz.

13. The system according to claim 12, wherein at least one of:
(i) the mobile end device comprises one of the following: a mobile telephone a tablet computer, a mobile navigation device, and a smart watch,
(ii) the first signal sensor comprises at least one of the following: at least one acceleration sensor, at least one rotation rate sensor, at least one microphone, a camera, at least one temperature sensor, at least one magnetic field sensor, or any combination thereof,
(iii) the structure in the interior of the rail vehicle includes a storage device including at least one of a luggage rack, a table, a storage of a seat, a lockable compartment of the rail vehicle, or any combination thereof, and the mobile end device, during the capturing step, is connectable to the storage device,
(iv) the structure in the interior of the rail vehicle has a wall, and the mobile end device, for the capturing step, is connectable to the wall,
(v) the mobile end device, for the capturing step, is fixedly and substantially rigidly connected to the structure in the interior of the rail vehicle,
(vi) the system further comprises a clamping device that connects the mobile end device, for the capturing step, to the structure in the interior of the rail vehicle,
(vii) the system further comprises a holder that connects the mobile end device, for the capturing step, to the structure in the interior of the rail vehicle, wherein the holder is at least one of located in a lockable compartment of the rail vehicle, and spatially associated to a charging device for the mobile end device,
(viii) the system further comprises the holder connectable to the structure in the interior of the rail vehicle, wherein the holder is configured to hold the mobile end device, for the first capturing step, in at least one of a predeterminable first measurement position and a predeterminable first measurement orientation, and, for a second capturing step, in at least one of a predeterminable second measurement position and a predeterminable second measurement orientation different than the at least one of the predeterminable first measurement position and the predeterminable first measurement orientation, or any combination thereof.

14. The system according to claim 12, wherein the at least one data processing device is data processing device of at least one of the rail vehicle and the mobile end device.

15. A mobile end device for determining a value of at least one state parameter of at least one of a rail vehicle and a track for the rail vehicle, comprising:
at least one first signal sensor; and
a data processing device,
wherein the at least one first signal sensor is configured for capturing at least one actual first capturing signal correlated to the actual value of the state parameter,
wherein the at least one first signal sensor is internal to the mobile end device,
wherein, for determining the value of the at least one state parameter, the data processing device is configured to at least one of:
(i) evaluate the at least one actual first capturing signal in a frequency range of at least one of: 1 Hz to 2 Hz, 4 Hz to 15 kHz, and 10 Hz to 1 kHz, and
(ii) output the at least one actual first capturing signal to a further data processing device in a manner which allows evaluation of the at least one actual first capturing signal in a frequency range of least one of: 1 Hz to 2 Hz, 4 Hz to 15 kHz, and 10 Hz to 1 kHz, in the further data processing device.

* * * * *

UNITED STATES PATENT AND TRADEMARK OFFICE
CERTIFICATE OF CORRECTION

PATENT NO. : 10,343,700 B2
APPLICATION NO. : 15/513360
DATED : July 9, 2019
INVENTOR(S) : Volker Brundisch Page 1 of 1

It is certified that error appears in the above-identified patent and that said Letters Patent is hereby corrected as shown below:

In the Claims

Column 19, Line 13, Claim 12, after "vehicle" insert -- at --

Signed and Sealed this
Twenty-fourth Day of September, 2019

Andrei Iancu
*Director of the United States Patent and Trademark Office*